INVENTOR.
J. D. BROWDER
BY
George E. Pearson
ATTORNEY

INVENTOR.
J. D. BROWDER
BY George E. Pearson
ATTORNEY

United States Patent Office 3,475,706

Patented Oct. 28, 1969

3,475,706

SIGNAL-TO-NOISE RATIO ENHANCER UTILIZING BRIDGE CIRCUIT HAVING TWO ARMS OF DIFFERING RESONANT FREQUENCY BUT SIMILAR INDUCTANCE AND RESISTANCE

Jewel D. Browder, 1031 Alexandria Drive, San Diego, Calif. 92107

Filed Aug. 24, 1966, Ser. No. 574,615
Int. Cl. H03h 7/10
U.S. Cl. 333—74 10 Claims

ABSTRACT OF THE DISCLOSURE

An electrical filter for suppressing impulse-noise disturbances in electrical communication systems and the like uses a bridge circuit whose arms comprise frequency-selective networks which allow the passage therethrough of carrier-frequency signals but restrict the passage of impulse-noise producing transients. Fundamental and harmonic resonances are so employed in the networks that the bridge is unbalanced to carrier-frequency signals and thus presents relatively low impedance to their passage, but is substantially balanced and consequently presents relatively high impedance to the passage of transients.

My invention relates to the suppression of electrical noise disturbances which often occur in electrical power and communication systems. It relates specifically to the attenuation or elimination of impulse-noise caused by switching surges, various man-made electrical devices, and especially to the well-known atmospherics or noise disturbances due to natural atmospheric static disturbances.

The present invention is based on a new concept in the art of electrical noise suppression. More specifically, it takes advantage of the fundamental difference which exists between the behaviors of sinusoidal and transient or impulse currents as they pass through a frequency sensitive network. Said difference not only lends itself to mathematical analysis but is also verified by actual performance results of the present invention.

The present invention is essentially an electrical filter which differs from conventional filters in that it comprises a bridge circuit that passes a selected band of signal frequencies with little insertion loss. Also, (1) it is immune to shock excitations with consequent ringing voltages, and (2) it rejects the passage of noise-producing electrical impulses of both man-made and natural atmospheric static varieties. Employing fundamental and harmonic resonances, the bridge is unbalanced to signal frequencies so as to allow signals to pass, but is substantially balanced to impulses to reject their passage.

As otherwise expressed the inventive concept hereinvolved is one in which a bridge circuit having frequency-selective networks in its arms allows sinusoidal currents to pass from their source to the load element, but greatly restricts the passage of transient or impulse currents, thereby enhancing the signal-to-noise ratio on the basis that sinusoidal currents constitute signals while transient or impulse currents constitute noise disturbances. This basis proves to be valid when signals and noise disturbances are conveyed by a sinusoidal carrier. To such a carrier said bridge circuit is unbalanced and presents relatively low impedance to its passage, but to nonsinusoidal or impulse-noise disturbances the bridge is substantially balanced and presents relatively high impedance. The manner in which these performances are accomplished will best be understood from circuit examples as hereinafter described.

Suppressing transient interference in electrical systems is a problem which becomes more and more significant, since it is virtually proportional to the ever-increasing expansion and complexity of said systems. In power systems the art of reducing the amplitudes of electrical interferences is largely confined to the use of transformers equipped with Faraday shields, and circuit elements which have nonlinear resistances such as thyrite and certain diodes. But in communication systems the problem is far more extensive and of greater complexity due chiefly to the relatively small amplitudes of signal currents employed. That is, the power level is so low that communication systems are highly susceptible to extraneous currents which usually originate at remote, external sources.

In the reception of radio signals, for example, the suppression or elimination of impulse-noise disturbances has long challenged many investigators. Different solutions or devices have been introduced. A common principle of these devices is to allow the desired signal to pass through the receiver unaffected, but to make the receiver inoperative for amplitudes greater than that of the signal. Such devices are generally referred to as limiters. Some of these cause signal distortion proportional to the amount of noise suppression accomplished. Another group of devices is known as silencers and blankers, since they silence, blank out, or render inoperative the receiver during the short duration time of an individual pulse. Ordinarily, the listener does not hear the "hole" because of its short duration, but in the case of repetitive impulses, such as precipitation static, these latter devices are virtually useless. The obvious limitations of both groups of said devices make them generally unsatisfactory because they, (a) fail to operate on all types of impulse-noise disturbances, (b) distort the signal in proportion to the amount of noise suppression accomplished, and (c) deteriorate signal intelligibility by punching holes in the signals.

Contrasted to conventional noise-suppressing devices is the present invention which contemplates (a) the reduction of noise disturbances to amplitudes which lie considerably below the amplitudes of accompanying signals, (b) effective suppression of all variations of impulse-noise disturbances including the usual kinds of atmospherics, (c) noise suppression without signal distortion, (d) noise suppression without punching holes in the signals, and (e) all these are achieved without frequent adjustment of control knobs and without impairing the bandwidth or signal fidelity in any manner.

These contemplated features of the present invention are achieved by (a) recognizing the fact that transient and impulse-noise disturbances encountered in communication systems have nonsinusoidal waveforms and superpose themselves on the sinusoids of the carrier-frequency of a communication system by adding thereto with respect to algebraic signs, and (b) utilizing the fundamental difference between the behavior of sinusoidal transient or impulse currents during their passage through frequency-sensitive networks as subsequently described.

The principal object of my invention is to provide a new and improved technique of suppressing undesired nonsinusoidal voltages and currents occurring in electrical communication systems and the like.

Another object of my invention is to provide a new and improved signal-to-noise ratio enhancing technique that may be employed either (a) in conjunction with existing communication systems as a separate unit coordinated and interconnected therewith, or (b) as an integral part of future communication systems.

A further object of the invention is to provide a new and improved noise-suppressing technique which is universally applicable to all forms of sinusoidal signals as exemplified by land-line telephone, telegraph, facsimile and data-processing systems, radar and sonar detection and guidance systems, and the several varieties of radio communication, telemetering, control and navigation systems, and the like.

Still another object of the invention is to provide a new and improved signal-to-noise ratio enhancer which has an audio-frequency input, as distinguished from a carrier or intermediate-frequency signal input to which the basic principles of the invention are directly applicable as subsequently described.

Other features, advantages, and objects of the present invention in addition to those heretofore specifically set forth are those inherent in or to be implied from the novel circuit arrangements and elements employed in the various modifications and embodiments hereinafter to be described which represent the best mode thus far devised for practicing the principles of the invention.

A full understanding of the invention may be acquired by referring to the following description and claims, taken in conjunction with the following drawings, forming a part of this specification, and in which drawings:

Figure 5:
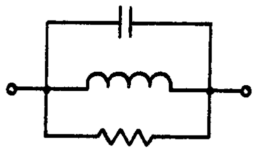
Figure 4:
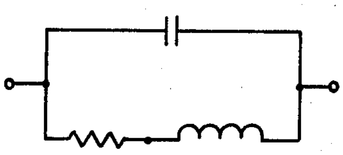
Figure 6:
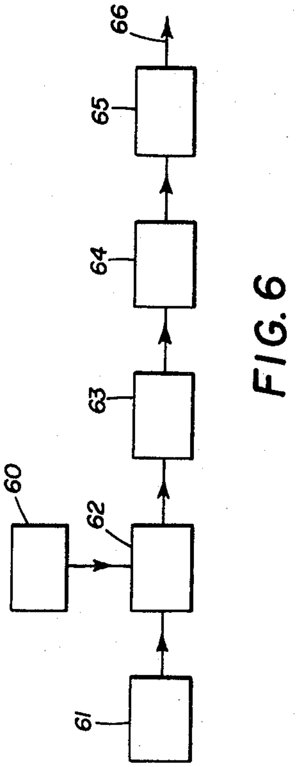

FIGURES 4 and 5 are schematic diagrams of well-know networks or combinations of resistance, inductance and capacitance which are useful in the design of the invention; and FIGURE 6 is a block diagram representing the essential elements of an embodiment of the invention which enhances the signal-to-noise ratio of audio-frequency signals as distinguished from radio-frequency, carrier-frequency, and intermediate frequency signals.

Figure 1:
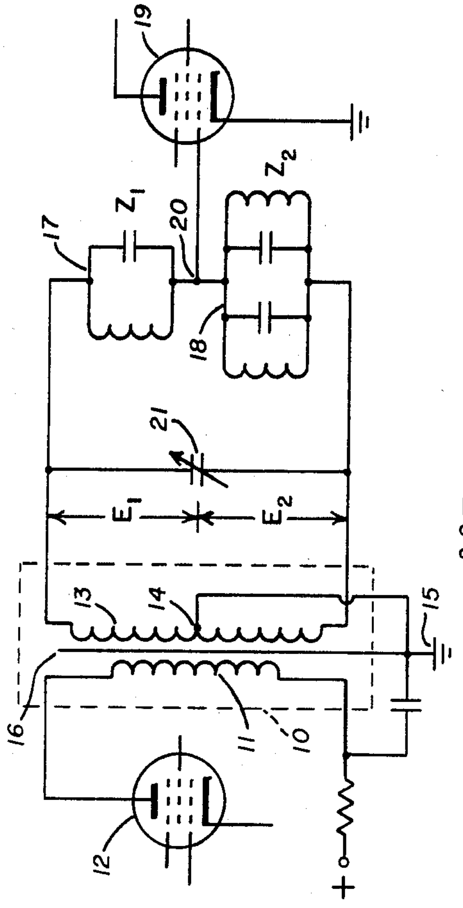
FIGURE 1 is a schematic diagram of one embodiment of the invention which utilizes the secondary winding of the signal transformer as a portion of the bridge circuit.

Design and operating principles of the invention are now described, beginning with FIGURE 1 which schematically depicts a basic circuital structure that comprises an embodiment of the invention. For illustrative purposes, let transformer 10 be a radio-or-carrier-frequency transformer having a primary winding 11 which is connected to an equivalent source of radio-or-carrier-frequency signals represented by the vacuum tube 12. It is understood that said vacuum tube may be a converter or an amplifier which is preceded by other conventional elements of a signal receiver. Secondary winding 13 has a center tap 14 grounded at 15. A Faraday shield 16 may be employed to minimize the parasitic capacitance between said windings. Inductor and shunted capacitor elements 17 and 18 are joined in series across the secondary winding, and a load element represented by vacuum tube 19 is connected across the output terminals comprising junction 20 of said inductor and shunted capacitor elements and said ground as indicated. In practice said load element may comprise a coupling transformer cascaded and placed between the output terminals and the vacuum tube. Variable capacitor 21 is employed to resonate the secondary winding to the frequency of the signal currents in the primary winding.

It is clear that the two halves of the secondary winding as marked by the center tap, and the series and parallel connected inductors with their shunted capacitors, comprise the four arms of a bridge circuit, with said winding halves being one series-connected pair of arms and said inductors another series-connected pair. Across the winding halves are voltages $E_1$ and $E_2$ which are in phase with each other, while the inductor arms of the pair comprise impedances $Z_1$ and $Z_2$ as shown in the diagram. Then in accordance with well known basic principles, if said impedances are adjusted to have the relation $$Z_1/Z_2=E_1/E_2$$

there will be no signal current passed to the load because the bridge is balanced, that is, there is no potential difference between the output terminals or ground and junction 20. Obviously such a bridge circuit is not desired because it prohibits an essential requirement which is the passage of signals to the load. Therefore the underlying principle of the present invention necessitates that $Z_1$ and $Z_2$ be so constructed as to allow the passage of signals (sinusoids) but prohibit or hinder the passage of noise disturbances (nonsinusoids).

This required performance of the invention is accomplished by employing the phenomenon of resonance. $Z_1$ and $Z_2$ are frequency-selective elements that may take the form of inductors or coils having different fundamental resonant frequencies which are harmonically related, yet they have substantially equal circuit parameters. That is, the combined or equivalent resistance, inductance and capacitance of the parallel-connected two-coil arm $Z_2$ are, respectively, equal to the resistance, inductance and capacitance of the single-coil arm $Z_1$. In FIGURE 1 the inductance and capacitance of the separate coils comprising $Z_1$ and $Z_2$ are indicated by the usual symbols, but the accompanying resistances have been omitted for sake of brevity since it is understood by persons skilled in the art that such resistances exist. It will be shown subsequently that the invention is operable by taking advantage of the multiple-resonance and variable-impedance properties of an inductor such as an R-F choke coil functioning by virtue of its inherent resistance, inductance and distributed or self capacitance.

Figure 2:
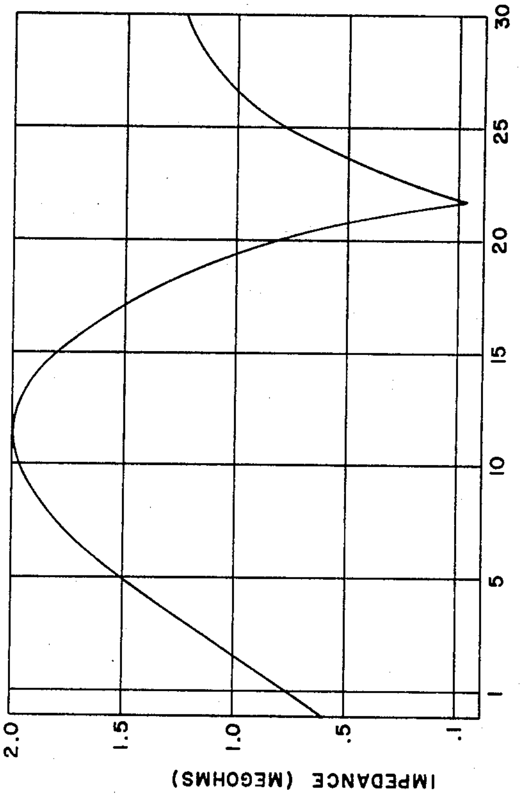
FIGURE 2 is a graphic illustration showing how the impedance of a radio-frequency choke coil varies with frequency of the applied voltage.

To illustrate, it is well known that such a coil presents different values of impedances over a wide range of frequencies among which are several resonant frequencies. At the minimum or lowest resonant frequency which is also known as the fundamental resonant frequency, the coil presents very high impedance and resonates in the mode of parallel-resonance which is also known as antiresonance. At substantially twice the fundamental frequency the coil resonates at the second-harmonic frequency, but this time the mode of resonance is that of series resonance wherein the coil presents a considerably lower impedance. Further, at approximately three times the fundamental resonant frequency, the coil resonates at the third-harmonic frequency and it again presents a relatively high impedance by resonating in the antiresonance mode. The process may be extended to include the fourth and still higher harmonics, but the significant point utilized in the present invention is the fact that at all odd-harmonic frequencies which includes the first or fundamental frequency the coil presents relatively high impedance, while at all even-harmonic frequencies the coil presents relatively low impedance. To clarify these basic points, the impedance-versus-frequency characteristics of a coil are illustrated in FIGURE 2, which appears in Radio Handbook, 15th ed., p. 361, Editors and Engineers, Summerland, Calif. It is seen that the particular coil involved has a fundamental resonant frequency of approximately 11 mc. with an impedance of 20 megaohms. Its second-harmonic resonance occurs at approximately 22 mc., with a very low impedance since this is a series resonance. The third and consecutive resonances likewise follow, as indicated.

Thus it can be seen that the different impedances and resonant frequencies can be provided by selecting suitable coils, for example, arm 17 or $Z_1$ offers high impedance by having a fundamental resonant frequency equal to that of the signal frequency; while in arm 18 or $Z_2$ the coils are preferably identical and have a fundamental resonant frequency which is the second sub-harmonic of the signal frequency, thereby offering relatively low impedance to the signal frequency since these coils operate at their second harmonic frequency. Then it is obvious that with $Z_1$ being a high impedance and $Z_2$ a low impedance, they present practically no load to signal voltages $E_1$ and $E_2$, and the only signal currents or voltages received by the load element 19 are those driven by $E_2$ by way of arm $Z_2$.

Substantially equal circuit parameters of the two arms, $Z_1$ and $Z_2$, are readily achieved by using a plurality of coils in one arm such as $Z_2$, FIGURE 1, whose equivalent parameters equal those of the single coil used in arm $Z_1$ as above shown. It will be clear to persons skilled in the art that various combinations of coils may be devised to meet these essential requirements, since resonances at even and odd harmonic frequencies with their respective high and low impedances afford diversification. For example, coil 17, FIGURE 1, may have a fundamental resonant frequency which is the third sub-harmonic of the signal frequency, instead of the first harmonic or fundamental frequency as above described, and similarly the coils of arm 18 or $Z_2$ may each have a fundamental resonant frequency equal to the fourth sub-harmonic of the signal frequency. Different wire sizes and air cores versus ferrite cores enable the resistance and inductance of a coil to be varied for achieving substantial equivalence of parameters.

The following design example illustrates how bridge arms $Z_1$ and $Z_2$, FIGURE 1, were provided for use in three cascaded 400 kc.s. intermediate-frequency amplifier stages of a radio-signal receiver. As this was an experimental model constructed for exploring the merits of the invention, specially designed coils were not used but rather standard stock air-core R-F choke coils were selected from the catalog of J. W. Miller Co., Los Angeles, Calif., and employed without modifications of any sort. Catalog Part No. 984, having fundamental resonant frequency of 398 kc., resistance of 105 ohms, and inductance of 15 mh., was chosen to serve as the high impedance arm in the manner of $Z_1$, FIGURE 1, as above described. For the low impedance arm such as $Z_2$, FIGURE 1, the stock coils did not include one having parameters suitable for use in a 2-coil arm and so it was necessary to choose one for use in a 3-coil arm. Thus the three coils were identical, each specified as Catalog Part No. 990, having fundamental resonant frequency of 190 kc.s., resistance of 316 ohms, and inductance of 47 mh. From these values it is seen that while there is a small discrepancy with respect to fundamental frequencies (the 398 kc.s. should be 400 kc.s. and the 190 kc.s. should be 200 kc.s.), the combined or equivalent resistance and inductance of said 3-coil arm approaches equivalency with those of the single-coil arm ($316/3=105.3$ and $47/3=15.6$). Further there is an obvious difference between equivalent capacitances since in the 3-coil arm there are three parallel-connected self-capacitances to weigh against the self-capacitance of the single-coil arm. This circuit parameter will be further discussed subsequently, but said experimental model clearly illustrates the requirement that the resistance, inductance and capacitance of the single coil which comprises the high-impedance arm $Z_1$ substantially equals, respectively, the combined or equivalent resistance, inductance and capacitance of the three coils which comprised the low-impedance arm $Z_2$. In other words the impedance magnitude and phase of $Z_1$ are approximately the same as those of $Z_2$, and it should be clear that by use of specially designed coils impedances and phase angles of the two arms ($Z_1$ and $Z_2$) can be made substantially equal and, if desired, $Z_2$ can be reduced to a 2-coil arm as depicted in FIGURE 1. In which case the resistance and inductance of each coil would be twice those of the single coil of $Z_1$, and the fundamental resonant frequency of each coil would be an even sub-harmonic of the signal frequency such as one-half or one-fourth as above described.

The necessity for substantially equal circuit parameters of the bridge arms is made clear by referring back to aforesaid equation which expresses a balanced bridge circuit, and wherein $E_1$ and $E_2$ were assumed to represent steady-state sinusoidal voltages and $Z_1$ and $Z_2$ the impedances presented to said voltages. But when $E_1$ and $E_2$ represent nonsinusoidal voltages which result from the passage of an impulse or transient current through the primary winding, then the conditions are analyzed in a different manner from that used with sinusoidal voltages. To impulse voltages the secondary winding and bridge arms $Z_1$ and $Z_2$ respond in a transient manner, involving impulse and step-function responses as expressed by instantaneous values of a nonsinusoidal waveform. As is well known these responses are analyzed by use of Ohm's law for resistive circuits, Kirchoff's voltage and current laws, and the differential expressions for inductance and capacitance. Since the concepts of inductive and capacitive reactances as well as impedance are only applicable to the sinusoidal steady-state condition, they have no meaning when dealing with a nonsinusoidal waveform. Hence only the basic parameters of resistance, inductance and capacitance are involved (completely disregarding the coil's fundamental resonant frequency), and so each of these must be balanced in the bridge arms in order to achieve a null in nonsinusoidal voltage across ground and junction 20, FIGURE 1. Incidentally, this as is well known also holds true for steady-state sinusoidal voltages. But the main point for emphasis here is the fact that when an impulse or transient voltage appears across the transformer secondary winding, its resultant voltage across the output terminals (center tap 14 and junction 20) approaches zero because said terminals have approximately the same potentials due to the two halves of the secondary winding having approximately equal resistances, inductances and capacitances, and likewise with the two arms, $Z_1$ and $Z_2$, as above described. Therefore, with the impulse or transient being attenuated by the well-known action of a bridge circuit, and with signals passing through the bridge with relatively small attenuation, it is obvious that the result is a signal-to-noise ratio enhancement. That is, the signal-to-noise ratio at the output terminals of the bridge circuit is considerably higher than that at the input terminals of the bridge.

However, it is clear that the effectiveness of the invention depends upon how accurately the bridge arms are constructed with respect to equalizing the separate parameters. Even with small discrepancies, the amplitude of an impulse voltage as measured across the load or input of vacuum-tube 19, FIGURE 1, is remarkably reduced below that measured across the secondary-winding terminals. But analysis shows that a more effective performance can be had by utilizing the full signal voltage developed across the secondary winding, that is, the sum of $E_1$ and $E_2$, FIGURE 1, instead of only $E_2$ as above discussed.

Figure 3:
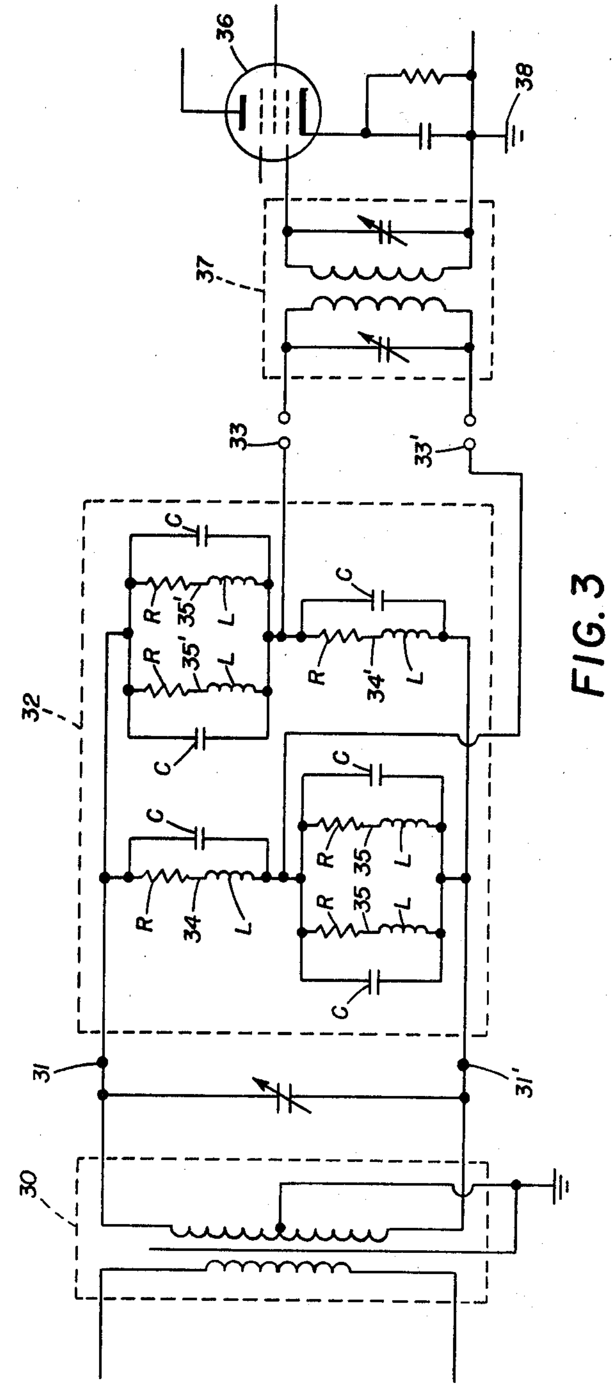
FIGURE 3 is a schematic diagram of another embodiment of the invention wherein the signal transformer serves mainly as a connecting link to the source of signals and accompanying noise disturbances.

Accordingly, the invention includes a second embodiment as illustrated schematically in FIGURE 3, wherein transformer 30 is similar to transformer 10, FIGURE 1. Its secondary winding, tuned by aid of a capacitor as shown, has terminals 31 and 31'; but the transformer serves mainly as a connecting link with the signal and noise equivalent source such as vacuum-tube 12, FIGURE 1, which is not shown in FIGURE 2 for sake of brevity, yet it is understood that an equivalent source is connected to the primary winding of said transformer. The bridge, designated 32, is an assemblage of coils forming a passive quadripole since it has two input and two output terminals and contains no internal source of E.M.F. Each pair of series-connected arms is designed to function in the same manner, for example, as the pair comprising $Z_1$ and $Z_2$ of FIGURE 1, above described. That is, 34 and 34' correspond with $Z_1$, and arms 35 and 35' correspond with $Z_2$. Further it is clear that terminals 33 and 33' are the output terminals, while the input terminals are obviously those joined to the secondary winding terminals 31 and 31'. Also, for sake of completeness, the resistance of each coil of the bridge circuit. FIGURE 2, is schematically represented as well as the inductance and capacitance, and are so designated R, L and C, respectively.

From the viewpoint of achieving maximum signal-to-noise ratio enhancement, experience has shown that it is advantageous to keep the bridge circuit balanced to ground particularly when operating at medium and high radio frequencies. Thus transformer 37 may be used to couple the bridge to vacuum-tube 36 which is grounded at 38.

It is also clear to persons skilled in the art that a plurality of bridge circuits of the kind designated 32, FIGURE 3, may be cascaded directly without intervening amplifiers since each presents a relatively small insertion loss. That is, the output of one may be joined to the input of another and in this way an overall performance can be obtained which compares favorably with that yielded by a single bridge whose arms are almost perfectly balanced.

A bridge so balanced as to yield a null output nonsinusoidal voltage, especially one having a spike waveform, obviously requires very careful adjustment of parameters. Resistances and inductances offer little difficulty, but experience shows that the self-capacitances of coils and stray capacitances of wiring are the most troublesome features involved in balancing the bridge arms. These troubles, however, can be greatly reduced by use of suitable corrective measures. That is, if a capacitor is joined across each high-impedance coil (34 and 34'), adding to the self-capacitance of the coil, then the total capacitance may approach equality with the combined or equivalent self-capacitance of the two parallel-connected coils of the respective series-connected arm (35 and 35'). But this additional capacitance obviously requires a decrease in the inductances of said high-impedance coils in order to retain their correct fundamental resonant frequencies. Unbalances due to stray capacitances may be lessened by using good construction techniques regarding lead dress, shielding and placement of component parts. A small differential capacitor connected across the input terminals with the rotating element grounded is also useful.

From the standpoint of Fourier's Therom, it might be argued that it is impossible to balance the bridge on the basis that all, or at least some, impulse voltages contain sinusoidal components having frequencies which fall in the signal pass-band, and hence these components pass through the bridge in the same manner as signals and thereby produce a noise disturbance. There may be certain instances or isolated cases where this can be shown. However, such an argument is not supported by empirical evidence, but quite the opposite has been observed. Results of many tests conducted on telephone-line carrier systems as well as in intermediate-frequency sections of radio-signal receivers have definitely shown that the common varieties of man-made impulse noise as well as atmospherics and precipitation static are suppressed to such marked degrees (15-to-35 db) that sinusoidal components falling within the pass-band are either nonexistent or of such small amplitudes as to be virtually insignificant.

It will be observed that other frequency-sensitive impedance devices or networks exist which could substitute for the coil or coil-capacitor bridge-arms employed in the above described embodiments of the present invention. Principally among these are R-C (resistance-capacitance) combinations, and perhaps certain ceramic and modern solid-state devices. Yet none appear to be so versatile and effective as R-L-C (resistance-inductance-capacitance) combinations which can be readily proportioned to meet resonant-frequency requirements while simultaneously (a) providing the required band-width, (b) effecting relatively small insertion loss, and (c) facilitating the balancing of bridge arms.

Supplementing the simple coil arrangements above shown, are at least two R-L-C combinations having features which are especially useful in the design of band-width requirements and balanced circuit parameters. These are schematically illustrated in FIGURES 4 and 5, and since their basic principles are both well known and adequately described in current textbooks a presentation of these matters as a part of this specification is regarded as unnecessary. In each of these combinations it will be understood that the capacitor may represent either the coil's self-capacitance alone or in combination with an external capacitor connected as shown. Further the main purpose of the resistor which appears in each network is to provide for the needs of band-width and balancing of bridge-arms.

Another and final embodiment of the invention is illustrated by a block diagram in FIGURE 6, whose distinguishing feature is the fact that its input and output signals can be of audio frequencies taken directly from such sources as a microphone or the output of a radio-signal receiver. In the foregoing embodiments, FIGURES 1 and 3, input signals of a modulated radio or carrier frequency are required, owing to noise pulses (nonsinusoidal) superposing themselves on sinusoids. Therefore in the present embodiment a continuous supply of sinusoids is provided in the from of a carrier frequency and modulated with the audio-frequency signals and any accompanying noise-disturbing impulses. The modulated carrier is then amplified and processed by either of aforesaid embodiments, FIGURES 1 and 3, to enhance the singal-to-noise ratio, after which said carrier is demodulated and the audio-frequency signals further processed as may be required.

Thus in FIGURE 6 blocks 60 and 61, respectively, represent a source of audio-frequency signals and accompanying noise disturbances, and a source of carrier-frequency sinusoids such as an oscillator. Both are joined to the input of a modulator 62 whose output feeds into a carrier-frequency amplifying system which includes either of aforesaid embodiments, FIGURES 1 and 3, and represented by block 63. Block 64 represents a detector or demodulator which removes the audio-frequency signals from the modulated carrier received from said block 63. Then the audio-frequency signals are passed to an audio-frequency amplifier, block 65, having an output at 66 for such additional processing as may be required, for example, for translation into audible sounds by a loudspeaker. Thus the signal-to-noise ratio at said output exceeds that at the source, block 60, owing to the noise suppression occurring in said carrier-frequency amplifying section, block 63, which comprises either of aforesaid embodiments.

It shall be understood that the invention is not limited in scope to the particular circuit arrangements above described, and that modifications which may occur to persons skilled in the art are contemplated. Among such modifications is a well-known bridge circuit which has the same structure as that depicted in FIGURE 1, except for transformer 10, which is replaced by an autotransformer or single winding having a center tap and with one-half of the winding connected to a signal and noise source. Such a bridge circuit operates by virtue of the mutual inductance which couples the two halves of the winding as described in the literature, particularly the textbook: Communication Engineering, second edition, 1937, pp. 309–10. William L. Everitt, McGraw-Hill Book Co., New York.

Having described my invention, what I claim is new and useful and desire to secure by United States Letters Patent are:

1. In a noise-suppressing alternating-current signaling system, an alternating-current bridge circuit energizable from a source of alternating-current signals and accompanying noise disturbances and comprising first, second, third and fourth frequency-sensitive arms, said first and second arms being connected in series and in the order named across first and second input terminals of the bridge and constituting one pair of arms of the bridge, said third and fourth arms being connected in series and in the order named across said first and second input terminals and constituting the other pair of arms of the bridge, one and the other of at least one of said pair of arms respectively having frequencies which are resonant and antiresonant at the signal frequency, and said one and said other of the arms respectively having substantially the same effective resistance, inductance and capacitance.

2. In a noise-suppressing alternating-current signaling system as in claim 1 and wherein said resonant frequency is equal to an even subharmonic of the signal frequency and said antiresonant frequency is equal to an odd harmonic of the signal frequency.

3. In a noise-suppressing alternating-current signaling system as in claim 1 and wherein the arms of said other pair of arms respectively are the halves of a center-tapped transformer winding having a tuning-capacitor connected thereacross.

4. In a noise-suppressing alternating-current signaling system as in claim 3 and wherein the center-tap of said transformer winding and the junction of said one and said other of the arms of said one of the pairs of arms are the output terminals of the bridge.

5. In a noise-suppressing alternating-current signaling system as in claim 1 and wherein the arms of said one of the pairs are said first and second arms, and said one and said other of the arms respectively are said first and second arms, wherein said fourth and third arms respectively have the same antiresonant and resonant frequencies as said first and second arms, and wherein all of said arms have substantially the same effective resistance, inductance, and capacitance.

6. In a noise-suppressing alternating-current signaling system as in claim 5 and wherein the arms of said one pair of arms comprise coil elements and one of the arms differs from the other arm by the number of coil elements employed therein.

7. In a noise-suppressing alternating-current signaling system as in claim 6 and wherein an arm having more than one coil has the coils of the same connected in parallel with each other.

8. In a noise-suppressing alternating-current signaling system as in claim 6 and wherein the capacitance of the arm is constituted in part by the self-capacitance of each coil.

9. In a noise-suppressing alternating-current signaling system as in claim 8 and wherein the self-capacitance is augmented by a shunted capacitance.

10. In a noise-suppressing alternating-current signaling system as in claim 6 and wherein the resistance of an arm is constituted in part by the coil-resistance and augmented in part by external resistance.

References Cited

UNITED STATES PATENTS

| | | | |
|---|---|---|---|
| 2,701,862 | 2/1955 | Artzt | 333—74 |
| 2,201,338 | 5/1940 | Hassler | 333—74 |
| 1,834,005 | 12/1931 | Roberts | 333—74 |
| 2,884,520 | 4/1959 | Lambert | 333—74 |
| 2,982,928 | 5/1961 | Kall | 333—70 |

HERMAN KARL SAALBACH, Primary Examiner

C. BARAFF, Assistant Examiner

U.S. Cl. X.R.

333—74